3,204,012
METHOD OF POLYMERIZATION OF FORMALDEHYDE
Tamotsu Eguchi and Takatoshi Fujiwara, Kurashiki, Japan, assignors to Kurashiki Rayon Company Limited, Kurashiki, Japan, a corporation of Japan
No Drawing. Filed Oct. 3, 1961, Ser. No. 142,505
Claims priority, application Japan, Mar. 29, 1961, 36/10,545
7 Claims. (Cl. 260—857)

The present invention relates to a novel, practical method of polymerization for obtaining formaldehyde polymers having high molecular weight, and more particularly to a method where gaseous formaldehyde is polymerized in a heterogeneous system by using a solid catalyst.

The principal object of the invention is to manufacture high molecular weight formaldehyde polymers which provide plastics, fibers and films having excellent thermal stability and mechanical properties.

Various methods of polymerization have heretofore been suggested for the polymerization of formaldehyde and several patents are known which disclose useful methods for manufacturing high molecular formaldehyde polymers.

The difference between these known methods and the method of the present invention will be explained in the following:

According to British Patent No. 748,836 and U.S. Patent No. 2,768,994, low molecular aliphatic and aromatic amines, such as tri-n-butylamine and diphenylamine are dissolved in a solvent of benzene or pentane and the like to provide a homogeneous solution, and formaldehyde in the gaseous state is blown into the solution to be polymerized. Such blow method of polymerization, however, must use several times the quantity of formaldehyde polymer to be obtained and it needs troublesome operations for the recovery and dehydration of the solvent so that it can not be said that it is an advantageous method economically.

In a typical example in Patent No. 3,005,799, high molecular weight polyoxymethylene is manufactured by passing gaseous formaldehyde to the activated aluminum which was prepared on an aluminum plate (or aluminum alloy plate) by amalgamation. The activated aluminum, however, is a thin film settled on the aluminum plate so that the actual operation of polymerization is not so simple since the activated thin film of two dimensions is liable to be stripped when the polyoxymethylene attached thereto is scraped during polymerization or after polymerization and moreover, the activity is reduced as the polymerization proceeds so that it is necessary to activate the aluminum surface repeatedly and the substantial continuous operation is not so simple. Moreover, the activity of the aluminum surface varies locally after long use so that it becomes difficult to obtain uniform polymerization over the total surface.

The present invention obviates the above disadvantages and provides a considerably improved method for manufacturing high molecular weight formaldehyde polymer in a very simple manner and with high polymerization yield, and the method does not need a solvent so that the operations of dehydration and recovery of solvent are not needed. The catalyst can be easily separated from the produced high molecular weight polymer, while on the other hand, a sufficiently large quantity of formaldehyde polymers compared with the quantity of catalysts used can be produced so that it is not always necessary to separate the catalyst from the product, and also for the purpose of actual use of the polymer the catalyst is not necessarily eliminated and it is rather preferred that the catalyst is present. Low molecular weight polyoxymethylene glycol and amorphous, vitreous polymers are not present in the polymers obtained and formaline odor is observed.

The high molecular weight polymer containing nitrogen to be used in the method of the invention includes primary, secondary and tertiary amines of the aliphatic, aromatic or alicyclic type and quaternary ammonium and derivatives thereof, cyano compounds or reaction products of cyano compounds and various organic compounds, such as nitrogen containing linear, cyclic or crosslinked high molecular compounds produced by addition polymerization, condensation polymerization, polyaddition reaction or copolymerization of low molecular compounds including amide bond, peptide bond, urea bond, thiourea bond and urethane bond and lactam bond. Some examples are shown as follows:

Polyamides, such as nylon 6.6 and nylon 6.10 and copolymerized polyamides thereof; urea resins, thiourea resins, melamine resins, polyglycine, polyleucine, polyalanine, and the like polypeptides; polymethylene-bisethyleneurea, polymethylene-bis-ethyleneurethane, high molecular polyamino acids, polyurethane, polyurea, polythiourea; polyaddition polymers of bis-lactam and diamine, and polyaddition polymers of acrylamide and the like, so-called condensation polymers; and the polyvinylpyridine, polyvinyl pyrrolidone, polyacrylonitrile and the like polymers and various nitrogen derivatives of high molecular compounds.

Before the present invention, the inventors have found that formaldehyde polymers can be produced by contacting gaseous formaldehyde with various gaseous amines. Further, the inventors tried the polymerization by contacting gaseous formaldehyde with solid amine, but found that solid amine is not an effective catalyst practically. On the other hand, if high molecular weight polymer containing nitrogen is used as catalyst, the polymerization of formaldehyde proceeds with surprisingly high rate and the formation and remarkable growth of formaldehyde polymer on the solid catalyst is recognized. Gaseous amine polymerizes formaldehyde effectively, but solid or crystalline amine of low molecular weight is not such an effective catalyst. This is perhaps due to the reason that in crystalline state gaseous formaldehyde can not disperse into the interior of the crystal. Accordingly, in the case of high molecular weight polymer catalyst, the state of the polymer (catalyst) seems to have great influence on the apparent polymerization rate. If, for instance, polyamide or polyurethane is used as a catalyst, pulverized particles give better catalytic effects than chips. In addition, the powders made by a suitable process of re-precipitation provide remarkably good catalytic effects. For instance, we prefer such a solvent which dissolves polyamide or polyurethane only at an elevated temperature, but can not dissolve it at a lower temperature (an alcoholic solvent, such as, glycerine, ethyleneglycol, propyleneglycol, 1,5 pentanediol, methanol to be used at a high pressure or normal pressure). The polymer is dissolved in such a solvent at an elevated temperature and is left to cool while violently agitated. Thus the pulverized polymer is obtained. It shows remarkably high catalytic ability. Although similar remarkable catalytic effects can also be obtained by the powder prepared by dissolving these catalysts in phenolic solvent such as phenol or cresol and by pouring these solutions into a non-solvent such as acetone or methanol (at a low temperature) to re-precipitate, the powder obtained by the former method shows superior catalytic effect.

The temperature of polymerization need not be limited to a particularly narrow range, but the range of −80 to 90° C., preferably between 0 to 70° C., is particularly suitable, and the best range can be determined by the user after examining various conditions.

As the polymerization system, a continuous system, batch system, moving bed system or other suitable system may be adopted and also the catalyst may be agitated by means of an agitator. Formaldehyde polymer thus produced does not cohere but deposits as fine grains so that it can be more easily crushed or pulverized. As the polymerization reaction, as well known, is strongly exothermic it is desirable to dissipate the heat of polymerization by suitable means.

Formaldehyde gas should be dehydrated similarly as in the known polymerization methods of formaldehyde.

The method of the invention will be explained by the following examples.

EXAMPLE 1

Chips of nylon 6.6 having an intrinsic viscosity of 1.01 dl./g. in metacresol at 30° C. were dissolved in phenol, and the solution was poured into methanol to form a precipitate which was extracted with acetone to be refined sufficiently.

The refined product was dried under reduced pressure and pulverized, and the powder passed through the 60 meshes sieve was used as catalyst. One hundred and fifty g. of paraformaldehyde were introduced into a one liter round bottomed flask and subjected to thermal decomposition slowly at 170° C. Monomeric formaldehyde gas generated was passed through two empty bottles and then it was delivered to a polymerizator through four U-tubes cooled to −18° C. As the polymerizator a horizontal cylinder made of glass having 5 cm. dia. and 35 cm. length was used and 1.0 g. of said catalyst powder was uniformly dispersed therein. White colored formaldehyde polymer had grown up from the surface of the catalyst and the manner of gradually increasing the deposit of white, fine granular polymer particles was directly observed by naked eyes. The polymerizator was maintained at 45° C. and the polymer deposit was agitated once in one hour. The polymerization was completed in six hours and yielded 94 g. of formaldehyde polymers which could be easily pulverized. The quantity of monomeric formaldehyde actually passed through the polymerizator was 102 g. and the yield of the polymer was 92%; the intrinsic viscosity of the polymer thus obtained was 1.49 dl./g. in parachlorophenol solution containing 2% α-pinene at 60° C.; the softening temperature was 178° C. and the melting point was 180° C.

EXAMPLE 2

One g. of nonamethylene polyurea obtained by polycondensation of nonamethylene diamine and urea at the molar ratio of 1:1 in the presence of 0.2 cc. (for 1.0 mol of nonamethylene diamine) of cyclohexyl amine (regulator of polymerization degree) at 260° C. was used as the polymerization catalyst. After the catalyst had been prepared it was sufficiently extracted with methanol and the coexisting oligomer was removed. It was dissolved in cresol and then poured into methanol to precipitate and the precipitate was sufficiently dried and crushed into powders, then passed through a sieve of 65 meshes. The intrinsic viscosity of the catalyst in metacresol (30° C.) was 0.22 dl./g. After the polymerization for five hours by the same method and apparatus as described in Example 1, 124 g. of formaldehyde polymer were obtained. Monomeric formaldehyde actually passed through the reactor was 128 g. and the yield of polymer was 97%. The intrinsic viscosity of the polymer thus obtained was 1.54 dl./g. in a parachlorophenol solution containing 2% α-pinene at 60° C.; it softened at 178° C. and melted at 181° C.

EXAMPLE 3

Using various high molecular weight polymers containing nitrogen as catalysts the polymerizations were carried out in the same polymerization vessel simultaneously. The catalysts were prepared by dissolving the following high molecular weight polymers containing nitrogen in respective solvents to provide homogeneous solutions which were poured into precipitants to form precipitates which were dried and passed through a sieve of 60 meshes. The catalysts were scattered each 0.300 g. in watch dishes of 5.0 cm. dia. respectively and these dishes were arranged on the bottom of a bottomed glass cylinder (polymerization apparatus) of 17.0 cm. dia. and 26.0 cm. height with cover. The catalysts used are shown in the following:

(a) *Polyacrylonitrile.*—This was a powdered sample prepared by emulsion polymerization initiated by potassium persulphate at 40° C. and having the degree of polymerization 1,450.

(b) *30/70 acrylonitrile/methyl vinylpyridine copolymer.*—This sample was prepared by polymerizing acrylonitrile and methyl vinylpyridine at 60° C. by emulsion polymerization and had the degree of polymerization, 1,040.

(c) *Melamine formaldehyde resin.*—This was a powdered sample of Sumirez resin No. 605, product of Sumitomo Kagaku Kōgyō Kabushiki Kaisha (resin treatment agent of papers havng nitrogen content of 37%).

(d) *50/50 nylon 6/nylon 6.6 copolymer.*—This sample was prepared by heating and melting equimolar amounts of nylon 6 and nylon 6.6 and had the intrinsic viscosity of 0.61 dl./g. in metacresol at 30° C.

(e) *Polymethyl vinylpyridine.*—This sample was prepared by the emulsion polymerization initiated by acidic sodium sulphite and ammonium persulphate under the presence of surface active agent at 60° C. and had the degree of polymerization 800.

(f) *Polyvinyl pyrrolidone.*—This sample was a product of the German BASF Company having the intrinsic viscosity in water at 30° C. of 1.33 dl./g.

The polymerization vessel was kept at 40° C. and substantially anhydrous formaldehyde gas was introduced into the center of the polymerization vessel and after the gaseous formaldehyde was introduced for three hours the quantities of formaldehyde polymers produced on the catalysts (a), (b), (c), (d), (e) and (f) were 0.745, 1.13, 1.70, 8.23, 0.76 and 0.76 g. respectively and the intrinsic viscosities in parachlorophenol containing 2% α-pinene at 60° C. were 1.41, 1.31, 1.40, 1.43, 1.30 and 1.35 dl./g. respectively. The melting points of the polymers were 180, 178, 178, 180, 178 and 179° C. respectively.

EXAMPLE 4

One hundred and twenty g. of dry paraformaldehyde were introduced in a round bottomed flask of one liter capacity and were slowly subjected to thermal decomposition at 165° C. Generated monomeric formaldehyde gas was delivered into an empty bottle and then passed through four U-tubes cooled to −17° C. and then introduced into one end of the polymerization apparatus A and the unreacted formaldehyde gas left out of the other end of the apparatus was directly delivered into the next polymerization apparatus B. As the polymerization apparatus A a horizontally located cylinder of 5 cm. dia. and 30 cm. length was used and 1.0 g. of powders of melamine formaldehyde resin (Sumirez resin No. 605 containing nitrogen 37% manufactured by Sumitomo Kagaku Kōgyō Kabushiki Kaisha and after passage through a 60-mesh screen sufficiently dried) was uniformly dispersed in the inside of the cylinder. The polymerization apparatus B was a horizontal cylinder of 3 cm. dia. and 30 cm. length and 1.0 g. of nylon 6.6 (the intrinsic viscosity of which was 1.01 dl./g. in metacresol at 30° C.; the powder passed through a 60 meshes screen and before use) was uniformly dispersed in the cylinder. The deposited polymers were agitated every 30 minutes. The polymerization vessel A was heated to 30 to 35° C. by the reaction heat during the polymerization and the vessel B was heated to 35 to 40° C. After five hours, 50.7 g. of polymer were produced in the polymerization vessel A, while in the vessel B 18.4 g. of formaldehyde polymer was produced. The quantity of monomeric formaldehyde introduced actually into the reaction vessel A from its one end was 70.0 g. and the yield of the polymer was 73% in the vessel A and 27% in B. The intrinsic viscosity of the polymer in the vessel A was 1.10 dl./g. in parachlorophenol containing 2% of α-pinene at 60° C. and that in B was 1.40 dl./g. The polymer in the vessel A had the melting point of 175° C. and in B 182 °C.

EXAMPLE 5

Anhydrous cyclohexyl hemiformal prepared from 37% formaline and cyclohexanol (at the molar ratio of 1:1) was subjected to thermal decomposition at 158° C. to generate formaldehyde vapour which, after passage through two U-shaped tubes cooled to −17° C., was introduced into a polymerizator filled with catalytic powders such as polyamide and polyurethane. The polymerizations were carried out in the same polymerization vessel described in Example 3 simultaneously.

The catalyst was prepared by the following three processes:

"A"-process, in which chip-shaped catalyst is dissolved in ethyleneglycol at 150° C. to prepare a 7% solution and the solution is cooled to room temperature under agitating to reprecipitate and to provide powders.

"B"-process, in which the 7% solution of chip dissolved in phenol is poured into methanol at 20° C. to reprecipitate into powders, and "C"-process, in which the chip is mechanically pulverized by a crusher into powders.

The catalysts used were well dried. Weight of each catalyst was 0.10 g. (particles of each catalyst had sieves-range between 60 and 80 meshes). The results of polymerization at 65° C. for six hours are shown in Table 1.

Table 1.—Polymerization ability of polyamide and polyurethane pulverized by the above different methods

| Catalyst | Method of manufacture | Yield of polyoxymethylene (g.) | Intrinsic Viscosity of polyoxymethylene (dl./g.) |
|---|---|---|---|
| Nylon 6 | A | 2.75 | 2.12 |
|  | B | 2.03 | 1.83 |
|  | C | 0.13 | 1.74 |
| Copolymerized nylon [1] | A | 4.05 | 1.91 |
|  | B | 2.92 | 2.13 |
|  | C | 0.23 | 1.80 |
| Polyurethane [2] | A | 1.94 | 1.77 |
|  | B | 1.58 | 2.12 |
|  | C | 0.11 | 1.62 |

[1] Nylon 6 and 6.6 were mixed at a molar ratio of 1:1 and synthesized by agitating for six hours at 250° C.
[2] 1.4 butanediol and hexamethylene diisocyanate were mixed at the molar ratio of 1:1 and synthesized by polycondensation.

What we claim is:

1. A method for the preparation of high molecular weight formaldehyde polymers comprising contacting substantially anhydrous gaseous formaldehyde with a solid high polymer selected from the group consisting of polyamides, polyureas, and polyurethanes.

2. A method according to claim 1, wherein a member of the group consisting of polyamide, polyurea and polyurethane in finely divided state is used as catalyst.

3. The method as claimed in claim 1, wherein said catalyst is used in a granular and porous form.

4. A method as claimed in claim 1 wherein a polyurethane is used which has been prepared by precipitation from its solution with a non-solvent.

5. A method as claimed in claim 1 wherein a polyurethane is used which has been precipitated by cooling an alcoholic solution thereof.

6. A method as claimed in claim 1 wherein a polyamide is used which has been prepared by precipitation from its solution with a non-solvent.

7. A method as claimed in claim 6 wherein a polyamide is used which has been precipitated by cooling an alcoholic solution thereof.

References Cited by the Examiner

UNITED STATES PATENTS 2,844,561  7/58  Bechtold et al. _____ 260—67
3,005,799  10/61  Wagner et al. _____ 260—67

FOREIGN PATENTS 1,254,844  1/61  France.
1,258,364  5/61  France.
938,428  10/63  Great Britain.

WILLIAM H. SHORT, *Primary Examiner.*

H. N. BURSTEIN, *Examiner.*